United States Patent Office 3,055,426
Patented Sept. 25, 1962

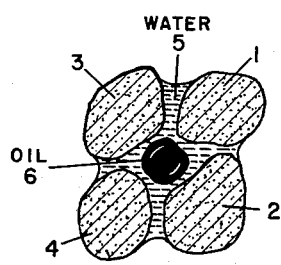
FIG. 1.
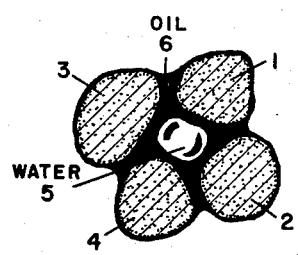
FIG. 2.
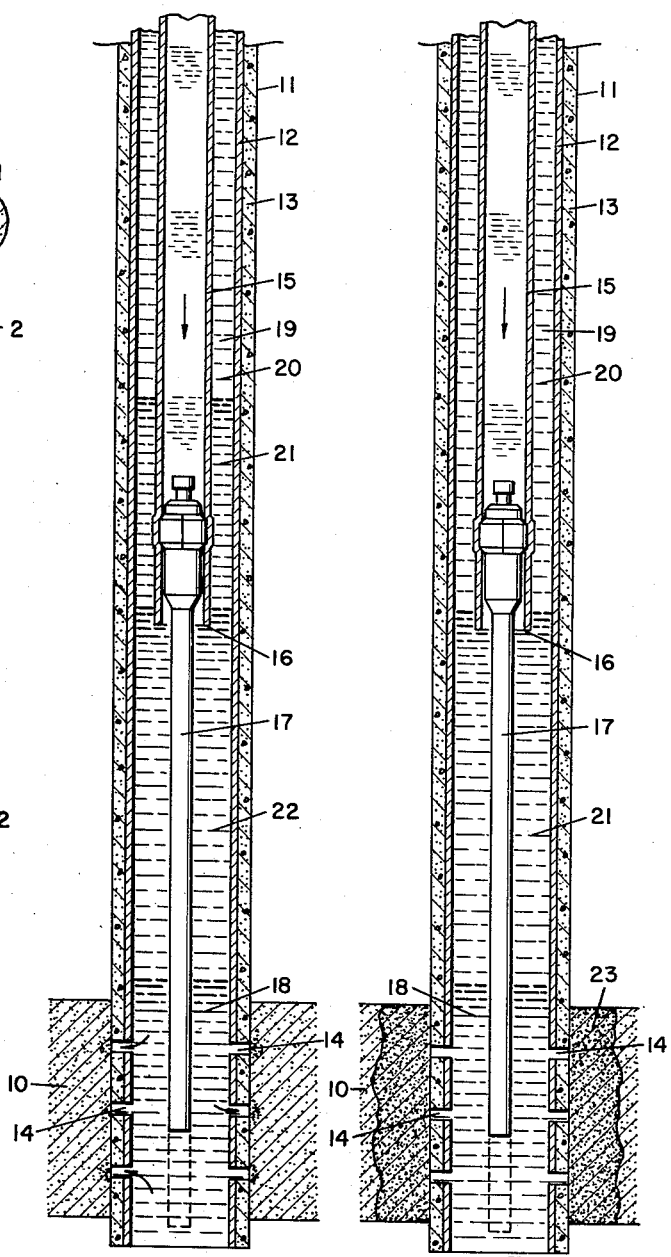
INVENTORS.
JOHN K. KERVER,
WARREN E. HOLLAND,
BY JOHN W. GRAHAM,
ATTORNEY.

3,055,426
METHOD FOR CONSOLIDATING INCOMPETENT SUBSURFACE EARTH ZONES
John K. Kerver and Warren E. Holland, Houston, and John W. Graham, Bellaire, Tex., assignors, by mesne assignments, to Jersey Production Research Company, Tulsa, Okla., a corporation of Delaware
Filed Feb. 5, 1959, Ser. No. 791,451
27 Claims. (Cl. 166—31)

The present invention is directed to a method for consolidating an incompetent subsurface earth zone. More particularly, the invention is concerned with consolidating an incompetent subsurface earth zone while maintaining the permeability of the consolidated zone. In its more specific aspects, the invention is concerned with treatment of an incompetent subsurface earth zone which has been rendered preferentially wet with water.

The present invention may be briefly described as a method for consolidating an incompetent subsurface earth zone pierced by a well in which there is injected into the incompetent zone a sufficient amount of a treating reagent to cause the incompetent zone to be wet preferentially by water in the incompetent zone. Thereafter, there is injected into the preferentially water wet incompetent zone a liquid halide of silicon whereby the incompetent zone is consolidated and the permeability of said zone is substantially maintained.

In the practice of the present invention, the incompetent zone may be suitably treated with a treating reagent which will preferentially wet with water the incompetent zone with the treating reagent either being in an aqueous solution or in an oil solution. The treating reagent employed to preferentially wet with water the incompetent zone is a surfactant and may be employed in a concentration within the range from about 0.1% to about 10% by weight of the solution. A preferred range for the surfactant may be from about 0.2% to about 5% by weight.

When an oil-soluble surfactant is employed and is introduced into the incompetent zone, the surfactant may suitably include compounds such as amine neutralized anionic surfactants, dodecyl benzene bottoms sulfonate such as the sodium salt, lauryl alcohol sulfates, sulfated alkyl esters, sodium-N-methyl-N-oleyl taurate, dihexyl-sodium-sulfosuccinate, sodium-di-2-ethyl-hexyl phosphate, ethyleneoxide condensate with hydrophobic base of polypropyleneoxide, and the like.

When an aqueous solution of a surfactant is employed to treat an incompetent zone, suitable compounds may include alkyl phenoxy polyethylene oxide, alkyl benzene sulfonates, polyethylene oxide esters, alkyl aryl sulfonates, and the like.

The liquid silicon halide is preferably silicon tetrachloride, but suitably may include other halides of silicon. Higher molecular weight chlorides of silicon may also be used. For example, silicon hexachloride may be used. The octachlorides of silicon may also be employed.

In practicing the present invention with the preferred silicon tetrachloride, the liquid halide is suitably employed as a solution in oil. For example, the concentration of silicon tetrachloride may be in the range from about 2% to about 80% by volume with a preferred range from about 4% to about 40% by volume. Substantially pure silicon tetrachloride may also be used.

The oil employed with the liquid halide may be crude petroleum or liquid fractions thereof. It will be preferred to use a solution of silicon tetrachloride in crude petroleum or kerosene.

The present invention will be further illustrated by reference to the drawing in which:

FIG. 1 illustrates a water-wet sand;
FIG. 2 is a showing of an oil wet sand;
FIG. 3 illustrates a mode of practicing the present invention; and
FIG. 4 is a showing of the preferred mode of the present invention.

Referring now to the drawing and particularly to FIGS. 1 and 2, when an earth formation containing sand grains is comfletely water wet, the water is located at the grain contacts and in the pendular regions around the sand grains as shown in FIG. 1. In a water-wet sand with sand grains 1, 2, 3, and 4, the grains are surrounded with a boundary 5 of water enclosing a body 6 of oil such that when the grains 1 to 4, inclusive, are treated with a liquid halide of silicon such as silicon tetrachloride, the precipitate resulting from the reaction of the silicon tetrachloride with water is formed at the contact of the sand grains and bonds them together without substantially altering the permeability of the sands. On the other hand, if the sand grains 1 to 4 inclusive, are wet with oil 6, as shown in FIG. 2, and the water is enclosed substantially by the sand grains and the oil, when the incompetent zone is treated with a liquid silicon halide such as silicon tetrachloride, the precipitate is formed at the center of the pore as shown in FIG. 2 and is not in contact with the sand grains. As a result the incompetent zone is not consolidated properly and permeability is substantially lowered.

The invention will be further described and illustrated by reference to FIG. 3, in which an incompetent subsurface zone 10 is pierced by a well bore 11 drilled from the earth's surface, not shown. Arranged in the well bore 11 is a casing 12 which is cemented in the well with primary cement 13. The casing 12 and cement 13 are perforated to form perforations 14 communicating the interior of the casing 12 with the incompetent zone 10.

Arranged in the casing 12 is a tubing string 15 with its lower end 16 arranged above the incompetent zone 10. Sealingly suspended from the lower end 16 of the tubing string 15 is a tubing extension member 17 which is provided for conducting fluid to and from the tubing string 15 and the incompetent zone 10.

There is shown in the casing 12 a body of silicon tetrachloride solution 18 which is adjacent the incompetent zone 10.

There is also shown in the annulus 19 a column of drilling mud 20 which has been displaced upwardly into the annulus 19 by blanketing fluid 21, which is spaced from the body 18 by a body 22 of an oil solution containing a surfactant reagent which renders the sand grains of the incompetent zone 10 preferentially wet with water.

In practicing the present invention in accordance with mode of FIG. 3, the drilling mud 20, which fills the casing 12, is displaced from the region of the incompetent zone 10 by the blanketing fluid 21. This blanketing fluid 21 may suitably be a nonaqueous fluid or a fluid which contains oil as the external phase such as a stable water-in-oil emulsion as disclosed in Serial No. 630,266, filed December 24, 1956, for Gerald G. Priest, Bryan E. Morgan, and Bertie F. Birdwell and Serial No. 630,026, filed December 24, 1956, for Gerald G. Priest, Bryan E. Morgan, Bertie F. Birdwell, and Joseph A. Caldwell. Other stable emulsions where oil is the external phase may be used such as described in U.S. Patents 2,793,188, 2,793,189, and 2,805,722. The blanketing fluid must have a density or viscosity sufficiently great to displace the drilling mud 20 and yet must be such that water is not the external phase and no water is provided to contact the exposed surfaces in the well casing. After at least the region of the well casing adjacent the incompetent zone 10 has been displaced substantially free of aqueous fluid, the body of blanketing fluid 21 is further displaced by an oily solution containing a surfactant which may be flowed down through the tubing string 15 and the tubular extension member 17 to a point adjacent the incompetent zone 10 and there forced out through the perforations 14 to contact the individual sand grains and to render them water wet as shown in FIG. 1. After the sand grains in zone 10 have been rendered water wet, as shown in FIG. 1, the body 22 may be displaced by body 18, which is then forced, at least in part, into the preferentially water-wet incompetent zone 10 to cause the silicon tetrachloride to react with the water there undergoing a hydrolysis reaction to form a precipitate which bonds the sand grains 1 to 4 together without substantially diminishing the permeability of the zone 10.

Thereafter any excess solution may be flowed from the well casing 12 by circulation of a clean fluid such as oil down the tubing string 15 and out the tubular extension member 17 which may have a length as shown by the dotted lines sufficient to cause substantially complete removal of the body 18 by circulation of fluid. Thereafter with a pressure differential into the well casing from the zone 10 hydrocarbons such as oil and/or gas may be produced from the zone 10 without production of the sand.

Referring now to FIG. 4 in which identical numerals designate identical parts, a similar arrangement of the tubing string 15 and tubing extension member 17 in the well casing 12 is provided. In this mode of operation, however, the drilling mud 20 is displaced into the casing-tubing annulus 19 by a body of blanketing fluid 21 and thereafter an aqueous solution of a surfactant is flowed downwardly through the tubing string 15 out the tubing extension member 17 and then forced into the incompetent zone 10 to form an area 23 which is preferentially wet with the water-soluble surfactant. In this particular instance all excess aqueous solution containing the water-soluble surfactant is removed from the casing 12 either by forcing it out into the incompetent zone 10 or by flowing it upwardly from the casing 12 by oil flowed down tubing string 15. Preferably excess aqueous solution of water-soluble surfactant is forced out into the incompetent zone 10 to cause preferential water-wetting of the sand grains, particularly in the area 23 surrounding the well bore 11. After the incompetent zone 10 has been treated as has been described with respect to FIG. 3 with the body 18 comprising an oil solution of silicon tetrachloride, the excess oil solution is removed by circulation with clean oil flowed down the tubing string 15 and up the casing-tubing annulus. Thereafter, production is obtained from the now consolidated incompetent zone 10 without concomitant production of sand.

The present invention is quite advantageous and useful since in producing oil and/or gas from poorly consolidated subsurface reservoirs, substantial amounts of loose sand are often produced. In some cases, the sand production is so severe that the wells must be shut in. In other cases the produced sand frequently erodes the tubing and well head equipment and even fills the oil-gas separator and plugs flow lines. The present invention substantially eliminates sand production by consolidation of the incompetent zone while maintaining substantially the permeability of the zone.

In practicing the present invention, particularly in the manner described in FIG. 3, it is good practice to inject a few barrels of a low concentration salt solution such as NaCl water into the formation prior to the treatment with the surfactant solution. An amount of salt water having a salinity in the range of about 3,000 to 35,000 parts per million of NaCl of about 1 to 2 barrels per vertical foot of formation is injected into an incompetent zone such as 10. This treatment with salt water is desirable since it insures that sufficient bulk water is available to wet the sand grains as shown in FIG. 1. Normally, an incompetent zone will naturally contain sufficient water. However, certain oil-wet formations, or regions around a well bore may lose and/or be devoid of water. The salt concentration is maintained sufficiently high to prevent formation damage due to clay swelling etc. and not so high as to interfere with the surface active properties of the salt sensitive surfactants. Thereafter clean oil or a blanketing fluid is pumped down the tubing and out an extension member such as 17 and up the casing to displace mud, water, and other aqueous fluids from the well. After the aqueous fluid has at least been displaced from the region of the incompetent zone, oil solution or aqueous solution containing a surfactant is injected into the incompetent zone to render it preferentially water-wet and establish permeability to oil in the formation. When an aqueous solution is used, the treated zone should be flushed with or have injected into a clean oil to reduce water saturation to a low value and to establish oil permeability. Treatment with oil containing a surfactant also reduces water to a low value. Thereafter a silicon tetrachloride-oil solution is injected into the formation by flowing it down the tubing and forcing it into the incompetent zone by pressure imposed either on the tubing or on the tubing-casing annulus or on both the tubing and the tubing-casing annulus. In all steps of the practice of the present invention where injection into the incompetent zone is performed, pressure is likewise imposed. After the treatment has been completed, the well and the formation may be flushed with a clean oil; that is, one substantially free from water and production from the well is accomplished by providing a pressure differential into the well casing from the now consolidated incompetent zone.

The present invention will be further illustrated by a number of operations which were conducted. In these operations, sand samples were obtained from several oil producing reservoirs and these sands were packed in flow tubes and then saturated with water and oil to simulate an oil producing sand. The oil sand was then treated by injecting a water solution of surfactant to cause the sand to be preferentially water-wet. The surfactant solution was then displaced with oil and the so-treated sand was then treated with an oil solution of silicon tetrachloride in concentrations ranging from about 4% to about 40%. The results of these operations are shown in Table I.

TABLE I

*Strength and Permeability of Sands From Oil Producing Reservoirs That Were Treated to be Water-Wet and Consolidated With Silicon Tetrachloride*

| Texas or Louisiana Sand Field | Well | Depth, ft. | Compressive Strength, p.s.i. | Permeability | |
|---|---|---|---|---|---|
| | | | | md. | Percent Original |
| A | 1 | | 1,330 | 2,080 | 84 |
| B | 2 | 7,766 | 1,900 | 585 | 76 |
| B | 3 | 7,478 and 7,370 | 1,160 | 3,940 | |
| B | 4 | | 1,010 | 4,990 | |
| C | 5 | | 1,500 | 4,210 | |
| D | 6 | 6,100 | 1,330 | 3,390 | |
| B | 7 | | 920 | 3,310 | |
| E | 8 | 2,788 | 1,440 | 5,930 | |
| F | 9 | 1,830-34 | | 3,510 | |

Considering the data in Table I, it will be clear that the so-treated sands had compressive strengths ranging from about 920 to 1900 pounds per square inch and permeabilities from 585 to 5930 millidarcys.

Other operations were conducted using the same procedure but omitting the treatment of the sand with the solution of surfactant. The results of these operations are shown in Table II.

TABLE II

*Properties of Partially Oil Wet Sands From Oil Producing Reservoirs After Consolidation With Silicon Tetrachloride*

| Field | Well | Permeability, md. | Compressive Strength, p.s.i. |
|---|---|---|---|
| A | 1 (dried at 110° C.) | 40 | 380 |
| B | 7 | 1,040 | 290 |
| B | 7 | 108 | 510 |
| C | 5 | 1,930 | 200 |
| A | 1 (treated with Armeen 12 to be strongly oil-wet). | Not consolidated sufficiently to obtain samples. | |

As a result of omitting the surfactant treatment, it will be clear from the data that the sands were not totally water-wet and the compressive strengths were only from 200 to 510 pounds per square inch. The permeabilities ranged from 40 to 1930 millidarcys. Comparing the data in Tables I and II for Field C, Well 5, it will be seen that the practice of the present invention resulted in a substantial improvement in compressive strengths and permeabilities.

Further showing the effect of complete and strong oil wetness, the sand from Field A, Well 1, was packed in a flow tube and saturated to simulate an oil sand and then treated with Armeen 12, a dodecylamine which promotes complete oil wetness. When this sand was treated with an oil solution of silicon tetrachloride as shown in Table II, the sand was not consolidated sufficiently to allow obtaining of samples for measurement of strength. These data are to be compared with the results shown in Table I where strengths of 1330 p.s.i. were obtained at a permeability of 2,080 millidarcys.

Also to be noted in Table II is that where the treatment of surfactant was omitted, Field A, Well 1, the compressive strength was only 380 p.s.i. and the permeability only 40 millidarcys.

The present invention is, therefore, quite important and useful in that incompetent zones may be consolidated and the permeability of the consolidated zone substantially maintained without any substantial impairment and therefore oil may be produced without the production of sand therewith which heretofore has resulted.

The nature and objects of the present invention having been completely described and illustrated, what we wish to claim as new and useful and obtain by Letters Patent is:

1. A method for consolidating an incompetent subsurface earth zone pierced by a well in which said zone contains oil-wet formation material which comprises injecting into said incompetent zone a sufficient amount of a surfactant treating reagent which causes said incompetent zone to be wet preferentially by water in said incompetent zone, and then injecting into said preferentially water-wet incompetent zone a liquid halide of silicon whereby said incompetent zone is consolidated and the permeability of said consolidated zone is maintained, sufficient water being present in said incompetent zone to provide water for hydrolysis of said halide of silicon.

2. A method in accordance with claim 1 in which the treating reagent is injected as a solution in oil.

3. A method in accordance with claim 1 in which the treating reagent is injected as an aqueous solution.

4. A method in accordance with claim 1 in which water is injected into said incompetent zone prior to said treating reagent.

5. A method for consolidating an incompetent subsurface earth zone pierced by a well in which said zone contains oil-wet formation material which comprises displacing aqueous fluids from at least the region of said incompetent zone in said well with a nonaqueous fluid, injecting into said incompetent zone a sufficient amount of a surfactant treating reagent which causes said incompetent zone to be wet preferentially by water in said incompetent zone, and then injecting into said preferentially water-wet incompetent zone a liquid halide of silicon whereby said incompetent zone is consolidated and the permeability of said consolidated zone is maintained, sufficient water being present in said incompetent zone to provide water for hydrolysis of said halide of silicon.

6. A method in accordance with claim 5 in which the treating reagent is injected as a solution in oil.

7. A method in accordance with claim 5 in which the treating reagent is injected as an aqueous solution.

8. A method for consolidating an incompetent subsurface earth zone pierced by a well in which said zone contains oil-wet formation material which comprises displacing aqueous fluids from at least the region of said incompetent zone in said well with a nonaqueous fluid, injecting into said incompetent zone a solution containing a sufficient amount within the range from about 0.1% to about 10% by weight of a surfactant treating reagent which causes said incompetent zone to be wet preferentially by water in said incompetent zone, and then injecting into said preferentially water-wet incompetent zone liquid silicon tetrachloride whereby said incompetent zone is consolidated and the permeability of said consolidated zone is maintained, sufficient water being present in said incompetent zone to provide water for hydrolysis of said silicon tetrachloride.

9. A method for consolidating an incompetent subsurface earth zone pierced by a well in which said zone contains oil-wet formation material which comprises injecting water into said incompetent zone, displacing aqueous fluids from at least the region of said incompetent zone in said well with a nonaqueous fluid, injecting into said incompetent zone a sufficient amount of a surfactant treating reagent which causes said incompetent zone to be wet preferentially by water in said incompetent zone, and then injecting into said preferentially water-wet incompetent zone a liquid halide of silicon whereby said incompetent zone is consolidated and the permeability of said consolidated zone is maintained, sufficient water being present in said incompetent zone to provide water for hydrolysis of said halide of silicon.

10. A method for producing hydrocarbons from an incompetent subsurface earth zone pierced by a well in which said zone contains oil-wet formation material which comprises injecting into said incompetent zone a sufficient amount of a surfactant treating reagent which causes said incompetent zone to be wet preferentially by water in said incompetent zone, then injecting into said preferentially water-wet incompetent zone a liquid halide of silicon whereby said incompetent zone is consolidated and the permeability of said consolidated zone is maintained, removing any excess liquid halide of silicon from said well, and then producing hydrocarbons from said consolidated incompetent zone, sufficient water being present in said incompetent zone to provide water for hydrolysis of said halide of silicon.

11. A method in accordance with claim 10 in which excess liquid halide of silicon is removed by displacement with clean oil.

12. A method for consolidating an incompetent subsurface earth zone pierced by a well in which said zone contains oil-wet formation material which comprises injecting into said incompetent zone a sufficient amount of a surfactant treating reagent which causes said incompetent zone to be wet preferentially by water in said incompetent zone, and then injecting into said preferentially water-wet incompetent zone a liquid chloride of silicon whereby said incompetent zone is consolidated and the permeability of said consolidated zone is maintained, sufficient water being present in said incompetent zone to provide water for hydrolysis of said chloride of silicon.

13. A method for consolidating an incompetent subsurface earth zone pierced by a well in which said zone contains oil-wet formation material which comprises injecting into said incompetent zone a sufficient amount of an aqueous solution of a surfactant treating reagent which causes said incompetent zone to be wet preferentially by water in said incompetent zone, substantially removing any excess aqueous solution from at least adjacent said incompetent zone in said well and then injecting into said preferentially water-wet incompetent zone an oil solution of a liquid halide of silicon whereby said incompetent zone is consolidated and the permeability of said consolidated zone is maintained, sufficient water being present in said incompetent zone to provide water for hydrolysis of said halide of silicon.

14. A method in accordance with claim 13 in which any excess aqueous solution is removed by forcing same into said incompetent zone.

15. A method in accordance with claim 2 in which the treating reagent is an amine neutralized anionic surfactant.

16. A method in accordance with claim 2 in which the treating reagent is sodium dodecyl benzene bottoms sulfonate.

17. A method in accordance with claim 2 in which the treating reagent is lauryl alcohol sulfate.

18. A method in accordance with claim 2 in which the treating reagent is sulfated alkyl ester.

19. A method in accordance with claim 2 in which the treating reagent is sodium N-methyl-N-oleyl taurate.

20. A method in accordance with claim 2 in which the treating reagent is dihexyl-sodium-sulfosuccinate.

21. A method in accordance with claim 2 in which the treating reagent is sodium-di-2-ethyl-hexyl phosphate.

22. A method in accordance with claim 2 in which treating reagent is ethylene oxide condensate with hydrophobic base of propylene oxide.

23. A method in accordance with claim 3 in which the treating reagent is alkyl phenoxy polyethylene oxide.

24. A method in accordance with claim 3 in which the treating reagent is alkyl benzene sulfonate .

25. A method in accordance with claim 3 in which the treating reagent is polyethylene oxide ester.

26. A method in accordance with claim 3 in which the treating reagent is alkyl aryl sulfonate.

27. A method in accordance with claim 9 in which the injected water contains sodium chloride.

References Cited in the file of this patent

UNITED STATES PATENTS

| | | |
|---|---|---|
| 2,019,908 | Kennedy et al. | Nov. 5, 1935 |
| 2,259,875 | Bent et al. | Oct. 21, 1941 |
| 2,378,817 | Wrightsman et al. | June 19, 1945 |
| 2,469,354 | Bond | May 10, 1949 |
| 2,614,635 | Williams et al. | Oct. 21, 1952 |
| 2,731,090 | Johnston | Jan. 17, 1956 |
| 2,808,886 | Bail et al. | Oct. 8, 1957 |